United States Patent
Rao et al.

(10) Patent No.: US 6,300,957 B1
(45) Date of Patent: Oct. 9, 2001

(54) MAPPING A NODE-LINK STRUCTURE TO A RENDERING SPACE BEGINNING FROM ANY NODE

(75) Inventors: Ramana B. Rao, San Francisco; John O. Lamping, Los Altos; Tichomir G. Tenev, San Jose, all of CA (US)

(73) Assignee: Inxight Software, Inc., Santa Clara, CA (US)

( * ) Notice: Subject to any disclaimer, the term of this patent is extended or adjusted under 35 U.S.C. 154(b) by 0 days.

(21) Appl. No.: 09/124,529

(22) Filed: Jul. 29, 1998

(51) Int. Cl.[7] .................................................. G06T 11/20
(52) U.S. Cl. .............................................. 345/441
(58) Field of Search ............................................. 345/441

(56) References Cited

U.S. PATENT DOCUMENTS

| | | | |
|---|---|---|---|
| 5,337,404 | 8/1994 | Baudelaire et al. | 395/141 |
| 5,515,487 | 5/1996 | Beaudet et al. | 395/140 |
| 5,590,250 | 12/1996 | Lamping et al. | 395/127 |
| 5,619,632 | * 4/1997 | Lamping et al. | 395/141 |
| 6,032,216 | * 2/2000 | Schmuck et al. | 710/200 |

OTHER PUBLICATIONS

Beckett, J., "Computer Whiz Burns to Learn, Ramana Rao wields technology smarts at Xerox startup," *San Francisco Chronicle*, Jun. 4, 1998.

Beier, T., and Neely, S., "Feature–Based Image Metamorphosis," *SIGGRAPH '92, Computer Graphics Proceedings*, vol. 26, No. 2, Chicago, Jul. 1992, pp. 35–42.

Fairchild, K.M., Poltrock, S.E., and Furnas, G.W., "SemNet: Three–Dimensional Graphic Representations of Large Knowledge Bases," in Guindon, R., Ed., *Cognitive Science and its Application for Human Computer Interaction*, Lawrence Erlbaum, Hillsdale, N.J., 1988, pp. 201–233.

Koike, H., and Yoshihara, H., "Fractal Approaches for Visualizing Huge Hierarchies," Proceedings of 1993 IEEE/CS Symposium on Visual Languages, Aug. 24–27, 1993, pp. 55–60.

Lamping, J. and Rao, R., "The Hyperbolic Browser: A Focus+Context Technique for Visulaizing Large Hierarchies," Sep. 5, 1995.

(List continued on next page.)

Primary Examiner—Mark Zimmerman
Assistant Examiner—Lance W. Sealey
(74) Attorney, Agent, or Firm—Mark A. Haynes; Haynes Beffel & Wolfeld LLP

(57) ABSTRACT

A node-link structure laid out in a space with negative curvature, such as the hyperbolic plane, is mapped to a rendering space, such as the unit disk, beginning from a starting element that has both a parent and a child. Data identifying the starting element are obtained, such as based on user signals. The starting element can be located at a starting position in the unit disk. Then a set of other elements can be mapped, each reachable from the starting element by a path that leads only through elements in the set. Each element's position in the negatively curved space relative to a preceding element on its path and the position of the preceding element in the rendering space can be used to obtain the element's position in the rendering space. The positions in the unit disk can then be used to present a representation of the node-link structure. The set of elements can include only a mapping root and descendants, where the mapping root is on an upward path from the starting element, but precedes the first element that maps to a position in the unit disk outside a precision horizon. A criterion can be applied to determine whether to map each element's descendants. If the rendering space has an active region within the precision horizon, it may not be necessary to map descendants if an element is outside the precision horizon or is outside the active region but has a parent inside the active region.

19 Claims, 7 Drawing Sheets

OTHER PUBLICATIONS

Matsuura, T., Taniguchi, K., Masuda, S., and Nakamura, T., "A Graph Editor for Large Trees with Browsing and Zooming Capabilities," *Systems and Computers in Japan*, vol. 24, No. 8, 1993, pp. 35–46.

Munzner, T., Burchard, P., and Chi, E.H., "Visualization through the World Wide Web with Geomview, Cyberview, W3Kit, and WebOOGL," asingle page hardcopied from the Web site designated by the URL http://www.ncsa.uiuc.edu/SDG/IT94/Proceedings/VR/munzner/munzner–abstract.html. Hardcopy of changes file from the Web site designated by the URL http://www.geom.umn.edu/software/download/geomview.html, bearing date Oct. 21, 1994.

Munzner, T., and Burchard, P., "Visualizing the Structure of the World Wide Web in 3D Hyperbolic Space," hardcopied from Web site URL http://www.geom.umn.edu:80/docs/research/webviz/ and following sequence of nodes, dated Nov. 21, 1995, also published in Proceedings of VRML. '95, (San Diego, CA, Dec. 14–15, 1995), special issue of Computer Graphics, ACM SIGGRAPH, New York, 1995, pp. 33–38 & 138.

Walsh, J., "Web site development, InXight interface adds animation to site maps," *INFOWORLD*, May 18, 1998.

\* cited by examiner

MAPPING A NODE-LINK STRUCTURE TO A RENDERING SPACE BEGINNING FROM ANY NODE

FIELD OF THE INVENTION

The invention relates to mapping a node-link structure laid out in negatively curved space into a rendering space, such as for presentation on a display.

BACKGROUND AND SUMMARY OF THE INVENTION

Lamping, J. and Rao, R., "The Hyperbolic Browser: A Focus+Context Technique for Visualizing Large Hierarchies", *Journal of Visual Languages and Computing*, Vol. 7, 1996, pp. 33–55, disclose techniques for laying out a hierarchy on a hyperbolic plane and then mapping the plane onto a Euclidean display region such as a unit disk. Initially, a tree has its root at the center or focus of the display region, but the display can be smoothly transformed to bring other nodes into focus. Changes of focus can be implemented by adjusting the focus of the mapping from the hyperbolic plane to the Euclidean plane, such as by a transformation in the hyperbolic plane that moves a new focus to the location that is mapped to the center of the unit disk. Lamping et al., U.S. Pat. No. 5,590,250, disclose similar mapping techniques in which a transformation is performed on positions in a layout space and the transformed positions are then mapped to obtain positions on a display; mapping is performed recursively, beginning at the root node.

Munzner, T., and Burchard, P., "Visualizing the Structure of the World Wide Web in 3D Hyperbolic Space", in *Proceedings of the VRML '95Symposium* (San Diego, Calif., Dec. 13–16, 1995), ACM SIGGRAPH, 1995, pages 33–38 and 138, disclose techniques based on laying out an exhaustive subtree of a graph in standard hyperbolic space. Due to multiple images, sophisticated level-of-detail culling is required to render the view inside a manifold efficiently. The choice of an exhaustive subtree corresponds to choosing a root node and, for each other node, one incoming edge. Taking the tree that would be obtained by navigating out from the root node and attaching all children, a subtree can be selected by choosing a traversal order for the tree and then only retaining the first copy of each graph node. A graphical representation is constructed and written into a 3D data file, which is loaded into Geomview, a public domain 3D viewer.

The invention addresses problems in mapping a node-link structure laid out in a space with negative curvature, such as hyperbolic space, into a rendering space, such as a two dimensional space in which it can be displayed.

With the techniques described by Lamping and Rao and with other conventional mapping techniques for node-link structures laid out in negatively curved space, mapping begins at a fixed part of the structure, such as the root node of a directed graph or a node at the lowest level of a directed graph. Mapping from the root node or other fixed part can be inefficient, however, if the point of interest in the structure is distant from the fixed part at which mapping begins, since the region of the structure around the fixed part may be of only peripheral interest. Furthermore, the representation of a location far from the root may cause loss of numerical precision, leading to mispositioning the node when it is mapped near the center.

The invention alleviates mapping problems due to beginning from a fixed part by providing techniques that can begin mapping at any element within the structure. The techniques obtain data identifying a starting element within the structure. The techniques then locate the starting element at a starting position in rendering space. Then, for each of a set of other elements of the structure, the techniques map the element's position in the negatively curved space to a position in rendering space. The set of other elements includes at least a parent and a child of the starting element, and each element in the set is reachable from the starting element by a path that leads only through elements in the set. In mapping the position of each element in the set, the techniques use the element's position relative to the preceding element in the negatively curved space and the position of the preceding element in the rendering space to obtain the element's position in the rendering space.

The starting position in rendering space can correspond to a display region's focus, for example. If the display region is a circle, the starting position can correspond to its center. The space with negative curvature space can be the hyperbolic plane, and the rendering space can be the unit disk.

Data identifying the starting element can be obtained based on signals from a user. For example, a user signal can indicate a position in a display region that can be converted to a position in rendering space and used to obtain data identifying the starting element. Or the user signal can indicate the starting element, and can be used to obtain data identifying the starting element; the signal can also indicate the starting position. Or the user signal can indicate a change in the node-link structure and data can be obtained that identify a starting element that is not affected by the change.

Where the node-link structure is a tree, locating the starting element can include walking up to the root element of the node-link structure to obtain identifiers of elements on the path from the starting element to the root element. Then, the identifiers can be used to walk down to the starting element, using the starting orientation of the root element to obtain the starting element's orientation in rendering space.

In one implementation, the rendering space includes a bounded precision region within which elements can be mapped with adequate precision. Mapping can include walking upward on a path from the starting element, mapping each element on the path, until a first element is mapped outside the precision region. Then a second element that precedes the first element along the upward path can be selected as a mapping root within the precision region. Mapping can be performed by then walking downward from the mapping root, the set of other elements thus including only the mapping root and descendants of the mapping root. For example, the first and second elements can be nodes, and the second element can be the node immediately preceding the first element on the upward path.

In this implementation, a criterion can be applied to determine whether to map descendants of each element that is mapped. The criterion can include determining whether the element has descendants in the node-link structure. It can also include determining whether the element is in the precision region. It can also include determining, in relation to an active region such as a view within the precision region, whether the element is in the active region or its parent is outside the active region. In accordance with this criterion, if an element has no descendants, is outside the precision region, or is outside the active region with a parent inside the active region, it is not necessary to map its descendants.

The new techniques are advantageous because it is often possible to identify a starting node that will provide more efficient mapping than other nodes. For example, a user may select a node to be positioned at the display region's focus. As a result, mapping can be done more efficiently than if it always began at a fixed part of the structure, and operations that require repeated mappings in a short period of time, such as animation, can be done more effectively.

The new techniques are especially advantageous if data defining the layout of the node-link structure indicate positions relative to other nodes in negatively curved space rather than indicating absolute positions. For example, a node's position relative to its parent could be indicated. With relative position data, computation can be especially efficient.

The new techniques are also advantageous because they avoid precision problems that can result when mapping to a rendering space begins at a root node. If there are too many generations between the root node and a node of interest, the position of the node of interest in the negatively curved space may be inadequately specified.

The following description, the drawings, and the claims further set forth these and other aspects, objects, features, and advantages of the invention.

DETAILED DESCRIPTION OF THE INVENTION

A. Conceptual Framework

Figure 1:
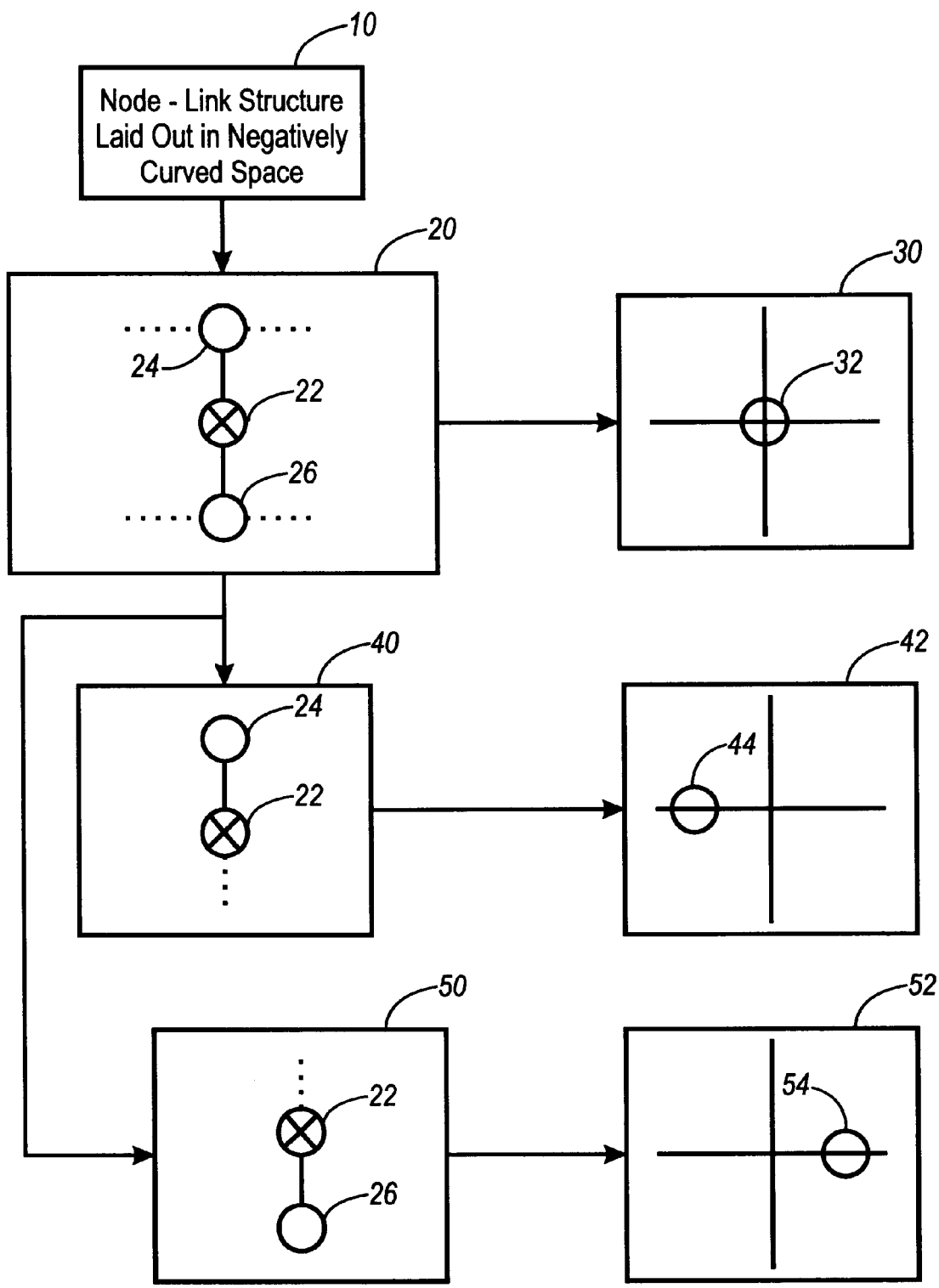
FIG. 1 is a schematic flow diagram showing how mapping can be performed from an element in a node-link structure that has a parent and a child.

The following conceptual framework, when taken with the conceptual frameworks set forth in U.S. Pat. Nos. 5,590,250 and 5,619,632, incorporated herein by reference, is helpful in understanding the broad scope of the invention, and the terms defined below have the indicated meanings throughout this application, including the claims.

A "node-link structure" is a structure that includes items that can be distinguished into nodes and links, with each link relating two or more of the nodes. A "graph" is a node-link structure in which each link relates two nodes. A "directed graph" is a graph in which each link indicates direction between the nodes it relates, with one node being a source or "from-node" of the link and the other being a destination or "to-node" of the link. An "acyclic directed graph" is a directed graph in which the links, when followed in their indicated directions, do not provide a path from any node back to itself. A "tree" is an acyclic directed graph with exactly one root node such that, for any non-root node in the tree, the links, when followed in their indicated directions provide only one path that begins at the root node and leads to the non-root node.

The "elements" of a node-link structure are its nodes and links.

In a node-link structure, a "node-link relationship" is a relationship between elements based on paths of nodes and links between or among the elements.

In many cases, node-link relationships can be summarized by category. In a directed graph, for example, the "children" of an element are the elements that can be reached from the element by following no more than one link in its indicated direction. Similarly, the "parents" of an element are the elements that can be reached from the element by following no more than one link opposite its indicated direction. Children and parents of a node thus include links and nodes, while children and parents of a link include only nodes. The "descendants" of an element include all of its children, the children of its children ("grandchildren"), etc. The "ancestors" of an element include all of its parents, the parents of its parents ("grandparents"), etc. The "siblings" of an element include all the other children of its parents. The "co-parents" of an element include all the other parents of its children.

In another type of node-link relationship among a set of elements that are being mapped, an element is "reachable" from another element by a path that leads only through elements in the set if there exists at least one path from the other element to the element that does not include any mappable elements that are not in the set. For example, if an implementation maps only positions of nodes, then an element is reachable from another element by a path that leads only through elements in the set if there exists a path that does not include any nodes that are not in the set.

An item of data "identifies" an element in a node-link structure if the item of data provides sufficient information to distinguish the element from other elements in the structure. For example, an item of data identifies an element if the item of data can be used to access data relating to the element rather than to access data relating to other elements.

The terms "space" and "position" have related meanings as follows: A "space" is a set of "positions" over any pair of which a distance measure for the space can be applied to obtain a distance between the pair of positions. Examples of types of spaces include one-dimensional spaces such as lines or rays; other n-dimensional spaces; continuous spaces; discrete approximations of continuous spaces; and so forth.

A "planar unit disk" or "unit disk" is a two-dimensional Euclidean space bounded by a circular perimeter, with first and second perpendicular axes that cross at the center of the perimeter, and with a radius along each axis from the center to the perimeter of one. As a result, each position in the unit disk can be uniquely identified by two coordinates, each between +1 and −1.

A "space with negative curvature" is a space in which parallel lines diverge. Therefore, through any position in a space with negative curvature that is not on a given straight line, there are multiple other straight lines parallel to the given straight line. An example of a space with negative curvature is hyperbolic n-space. A "hyperbolic plane" is a hyperbolic 2-space.

An operation "lays out" a structure in a space if the operation obtains data indicating positions in the space for elements of the structure. The structure is "laid out" in the space if data indicating such positions in the space has been obtained. The data could indicate absolute positions, such as with coordinate values measuring displacements from a set of universal references such as a coordinate origin, or the data could indicate relative positions, such as with coordinate values measuring displacements from a set of references based on the position of another element.

A "locating" is an operation that obtains data indicating a position of an element in a space. The operation "locates" the element in the space. As with a lay out operation, the data could indicate an absolute or relative position.

A "mapping" is an operation that uses data indicating one or more positions in a first space to obtain data indicating counterpart positions in a second space. For brevity, it may be said that the mapping uses a position in the first space to obtain a position in the second space. As above, the data could indicate absolute or relative positions in one or both of the spaces. The operation "maps" positions in the first space to counterpart positions in the second space. Each of a set of positions in the first space can be "mapped" to a counterpart position in the second space. A position in the first space "corresponds to" the position in the second space to which it is or could be mapped, and vice versa.

An operation such as mapping uses an element's position "relative to" another element if the operation uses data indicating a relative position of the element based on the position of the other element. Data indicating relative position could be previously obtained or they could be obtained by the operation, such as based on absolute positions of the two elements.

An operation "maps" a structure laid out in a first space into a second space if the operation maps the position in the first space of each of a set of elements of the structure to a counterpart position in the second space. The term "rendering space" is used herein as a convenient designation for a space into which a node-link structure can be mapped.

A "converting" of a position in a first space to a position in a second space is a mapping operation that simply uses an item of data indicating a position in the first space to obtain an item of data indicating a position in the second space. As above, the data could indicate an absolute or a relative position in one or both of the spaces. Between some types of spaces, merely converting positions does not produce a satisfactory mapping. For example, positions of elements of a large node-link structure laid out in a negatively curved space such as the hyperbolic plane cannot be satisfactorily mapped into a rendering space such as a unit disk merely by converting positions.

A "display space" or "display region" is a space or region within which information can be positioned for presentation in image form. A "focus" of a display region is a position or set of positions within the display region at which information is presented at greater detail than other positions.

A "walking" is an operation that accesses, in sequence, data relating to a sequence of elements in a node-link structure. The sequence of elements defines a "path"; depending on implementation, a path may include only nodes, only links, or a combination of nodes and links. A "walking down" is a walking that traverses directed links in their direction, while a "walking up" is a walking that traverses directed links opposite their direction.

An "orientation" of features in a representation is a positioning of the features relative to the position in which the representation is ordinarily viewed. For example, a representation ordinarily has top, left, right, and bottom sides, so that an orientation could be described as upward, leftward, rightward, or downward.

Elements can be mapped "with adequate precision" within a region of a rendering space if, for each of the elements, the difference between its mapped position and the position to which it would be mapped with infinite precision is less than S, where S is approximately the resolution of the presentation of the rendering space. For example, for a given computational implementation, and given a mapping operation and a set of numbers indicating a position to be mapped, if the mapping operation were performed on the position with infinite precision, the mapping would have adequate precision only if the cumulative error would be less than the pixel resolution of the rendering space.

An operation "applies a criterion" if the operation uses a criterion to reach a determination, such as whether to map descendants of an element.

The term "navigation signal" is used herein to mean a signal that indicates that the user has greater interest in a part of a node-link structure than in other parts. For example, an "expand signal" indicates a request to present a representation of a graph in which the representation of an element of the graph is expanded, while a n "contract signal" indicates a request to present a representation of a graph in which the representation of an element of the graph is contracted. Other examples include requests to present a part of the node-link structure at a specific position, which can be clone by selecting a bookmark or the like or by a point and click operation requesting that a feature pointed to be moved to a center of focus.

A signal "requests a change" in a node-link structure if the signal requests a change in one or more elements of the structure, such as an insertion or deletion of one or more elements or an operation such as moving or copying that can be implemented by a combination of insertions and deletions. A "processor" is a component of circuitry that responds to input signals by performing processing operations on data and by providing output signals. The input signals may, for example, include instructions, although not all processors receive instructions. The input signals to a processor may include input data for the processor's operations. The output signals similarly may include output data resulting from the processor's operations.

A "network" is a combination of circuitry through which a connection for transfer of data can be established between machines.

B. General Features

Figure 2:
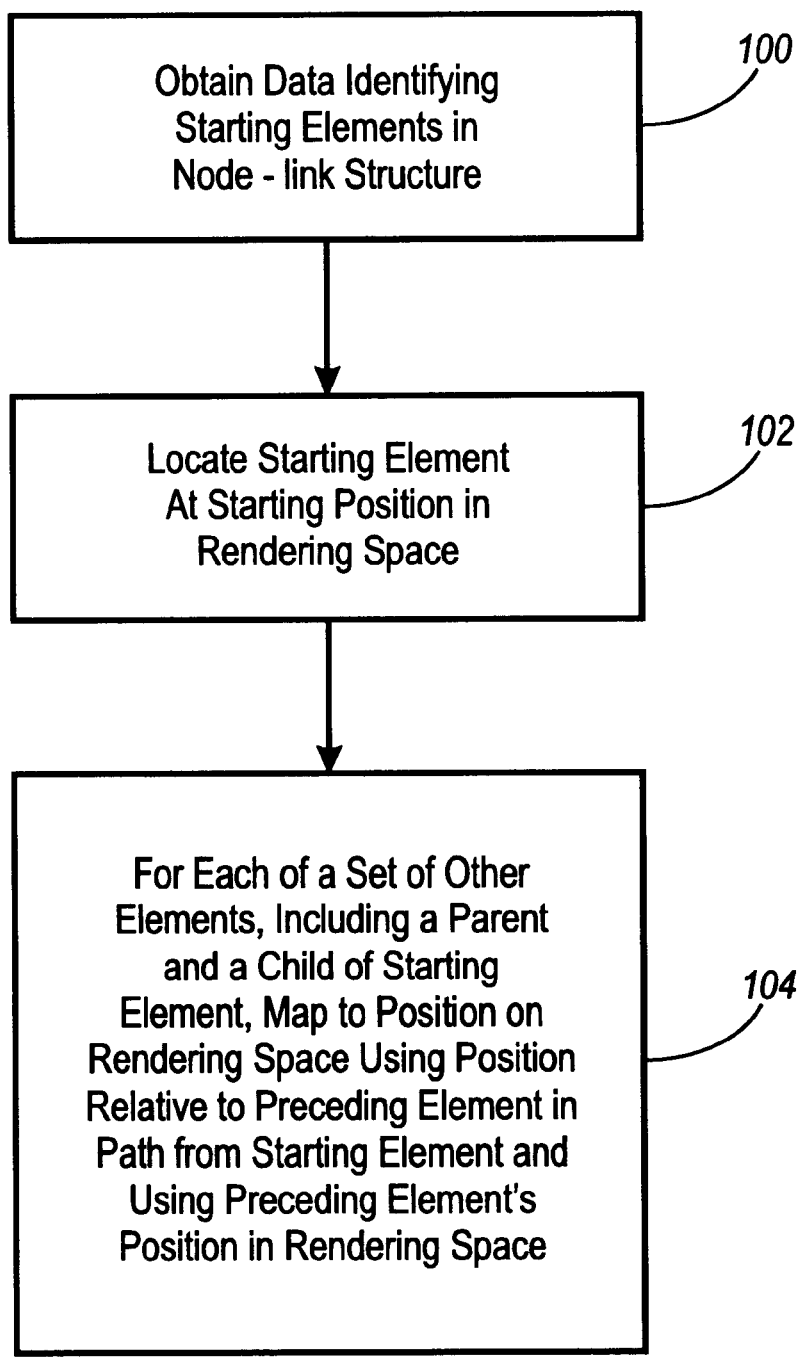
FIG. 2 is a flow chart showing general acts in performing mapping as illustrated in FIG. 1.
Figure 3:
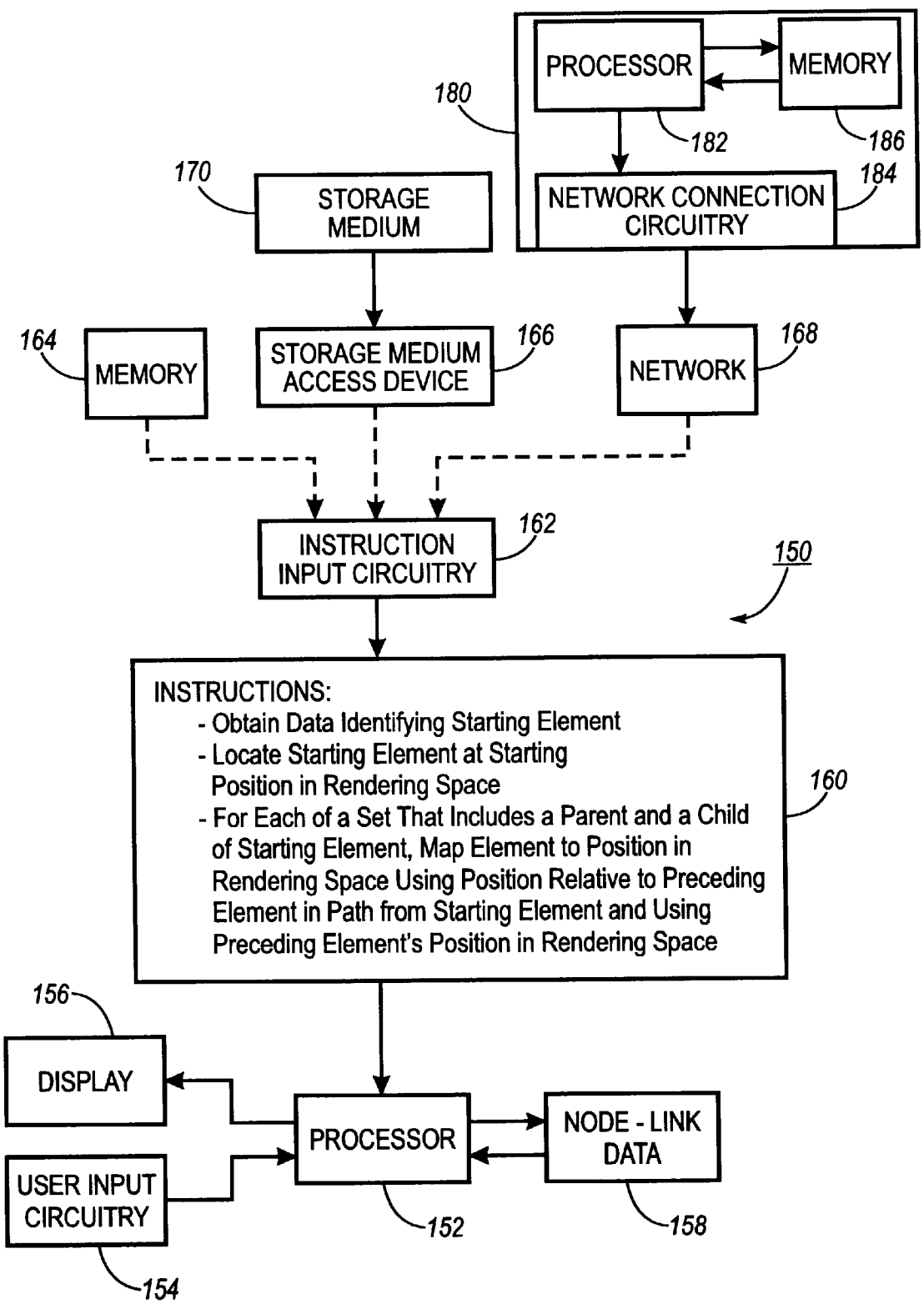
FIG. 3 is a schematic diagram showing general components of a machine that performs mapping as illustrated in FIG. 1.

FIGS. 1–3 show general features of the invention.

FIG. 1 illustrates how node-link structure 10 laid out in a space with negative curvature can be mapped into a rendering space beginning at an element with a parent and a child.

As indicated in box 20 by the "X", node 22 is identified as the starting element for mapping. Node 22 is linked to parent node 24, which may be one of a number of parent nodes, and to child node 26, which may be one of a number of children nodes.

As shown in box 30, node 22 is located at starting position 32 in rendering space. Starting position 32 is illustratively at the origin of a two dimensional space, but could be any other appropriate position in any appropriate rendering space.

Then, each of a set of other elements in node-link structure 10 can be mapped to a position in the rendering space. As illustrated in boxes 40 and 50, the set includes parent node 24 and child node 26. In addition, the set can include other elements, each of which is reachable from node 22 by a path that leads only through elements in the set, as defined above. As shown in box 20, parent node 24 and child node 26 are each reachable by such a path, because the paths to them from node 22 do not include any other mappable elements, either because only nodes are mapped or, if links are also mapped, because the set of elements also includes the links from node 22 to parent node 24 and child node 26.

Each element in the set is mapped by using the element's position relative to the preceding element in its path from node 22 and the position of the preceding element in the rendering space to obtain the element's position in the rendering space. For example, if only nodes are mapped, the preceding element of a node is the preceding node in its path. In this case, the preceding node of both parent node 24 and child node 26 is rode 22. As illustrated in box 42, parent node 24 is mapped to position 44; as illustrated in box 52, child node 26 is mapped to position 54.

In FIG. 2, the act in box 100 begins by obtaining data identifying a starting element in a node-link structure laid out in a space with negative curvature. The starting element could, for example, be a node indicated by a user as a node of interest, and the act in box 100 could respond to a user signal indicating the node by obtaining an identifier of the node.

The act in box 102 then locates the starting element at a starting position in rendering space. If the rendering space is a display region, for example, the starting position could be a focus of the display region.

Then the act in box 104 performs mapping for each of a set of elements, including at least one parent and at least one child of the starting element. In other words, rather than being the root of a directed graph or a node at the lowest level of a directed graph, the starting element has at least one parent and at least one child in the structure. In mapping each element in the set to a position in rendering space, the act in box 104 uses the position of the element relative to the preceding element in a path from the starting element that leads only through elements in the set. The act in box 104 also uses the preceding element's position in rendering space.

Machine 150 in FIG. 3 includes processor 152 connected for receiving data indicating user signals from user input circuitry 154 and for providing data defining images to display 156. Processor 152 is also connected for accessing node-link data 158, which define at least part of a node-link structure as laid out in a space with negative curvature. Processor 152 is also connected for receiving instruction data 160 indicating instructions through instruction input circuitry 162, which can illustratively provide instructions received from connections to memory 164, storage medium access device 166, or network 168.

In executing the instructions indicated by instruction data 160, processor 152 obtains an identifier of a starting element in the node-link structure. For example, processor 152 can receive user signals from user input circuitry 154 indicating a selected element, and can obtain an identifier of the selected element, which serves as the starting element. Processor 152 locates the starting element at a starting position in the rendering space. Then, for each of a set of other elements in the structure, processor 152 maps the element's position in negatively curved space to a position in rendering space. The set of other elements includes at least one parent and at least one child of the starting element. In mapping for each element in the set, processor 152 uses the position of the element relative to the preceding element in a path from the starting element that leads only through elements in the set; processor 152 also uses the preceding element's position in rendering space. Processor 152 could also use the positions of elements in rendering space to present a representation of the node-link structure on display 156.

As noted above, FIG. 3 illustrates three possible sources from which instruction input circuitry 162 could receive data indicating instructions—memory 164, storage medium access device 166, and network 168.

Memory 164 could be any conventional memory within machine 150, including random access memory (RAM) or read-only memory (ROM), or could be a peripheral or remote memory device of any kind. More generally, memory 164 could be a combination of more than one type of memory component.

Storage medium access device 166 could be a drive or other appropriate device or circuitry for accessing storage medium 170, which could, for example, be a magnetic medium such as a set of one or more tapes, diskettes, or floppy disks; an optical medium such as a set of one or more CD-ROMs; or any other appropriate medium for storing data. Storage medium 170 could be a part of machine 150, a part of a server or other peripheral or remote memory device, or a software product. In each of these cases, storage medium 170 is an article of manufacture that can be used by machine 150. Data units can be positioned on storage medium 170 so that storage medium access device 166 can access the data units and provide them in a sequence to processor 152 through instruction input circuitry 162. When provided in the sequence, the data units form instruction data 160, indicating instructions as illustrated.

Network 168 can provide instruction data 160 received from machine 180. Processor 182 in machine 180 can establish a connection with processor 152 over network 168 through network connection circuitry 184 and instruction input circuitry 162. Either processor could initiate the connection, and the connection could be established by any appropriate protocol. Then processor 182 can access instruction data stored in memory 186 and transfer the instruction data over network 168 to processor 152 so that processor 152 can receive instruction data 160 from network 168. Instruction data 160 can then be stored in memory 164 or elsewhere by processor 152, and can be executed.

C. Implementation

The general features described above could be implemented in numerous ways on various machines to map node-link structures to rendering spaces. An implementation described below has been implemented on a PC-based system running the 32 bit versions of Microsoft Windows and executing code compiled from C++language source code.

C.1. System

Figure 4:
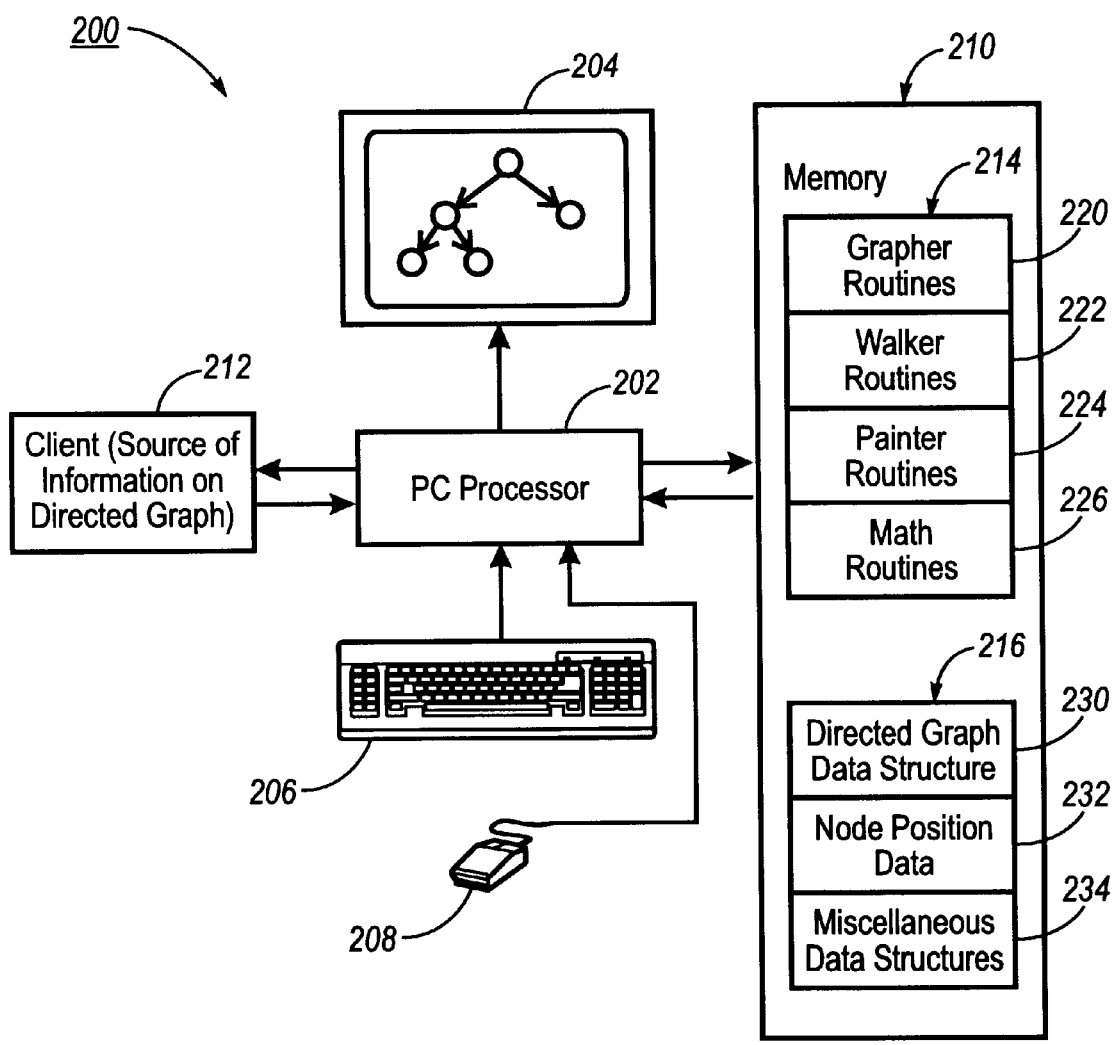
FIG. 4 is a schematic diagram of a system.

In FIG. 4, system 200 includes PC processor 202, which is connected to display 204 for presenting images and to keyboard 206 and mouse 208 for providing signals from a user. PC processor 202 is also connected so that it can access memory 210 and client 212. Memory 210 can illustratively include program memory 214 and data memory 216. Client 212 is a source of information about a directed graph, which could be a combination of routines and data stored in memory 210 or could be independent of memory 210 as shown. For example, processor 202 could communicate with client 212 through a network.

The routines stored in program memory 214 can be grouped into several functions. Grapher routines 220 create and modify a data structure representing the directed graph defined by the information from client 212. Walker routines 222 respond to navigation signals and other user signals from keyboard 206 and mouse 208 by obtaining information from the directed graph data structure. Painter routines 224 provide signals to display 204 to cause it to present representations of the directed graph data structure. Math routines 226 can be called to obtain positions of elements of the directed graph in a layout space.

Data memory 216 in turn contains data structures accessed by processor 202 during execution of routines in program memory 214. Directed graph data structure 230, as noted above, can be created and modified by grapher routines 220 and can also be accessed by walker routines 222 and painter routines 224.

Further details about the implementation of directed graph data structure 230 are set forth in copending coassigned U.S. patent applications Ser. No. 09/124,474, filed Jul. 29, 1998, entitled "Controlling Which Part of Data Defining a Node-Link Structure is in Memory", and Ser. No. 09/124,338, filed Jul. 29, 1998, entitled "Node-Link Data Defining a Graph and a Tree Within the Graph", now U.S. Pat. No. 6,108,698, both incorporated herein by reference.

Node position data 232, which can be linked to or included within directed graph data structure 230, can include positions of nodes in a negatively curved space such as a hyperbolic plane and in a rendering space such as a two-dimensional unit disk. Node position data 232 can be accessed by routines in program memory 214.

The routines in program memory 214 can also access various miscellaneous data structures 234. Data structures 234 may, for example, include an extra data structure for mapping from a pair of node IDs to a link ID, implemented as a standard heap; this extra data structure allows lookup and insertion of a link ID in time that is logarithmic in the number of links.

C.2. Responding to Events

Figure 5:
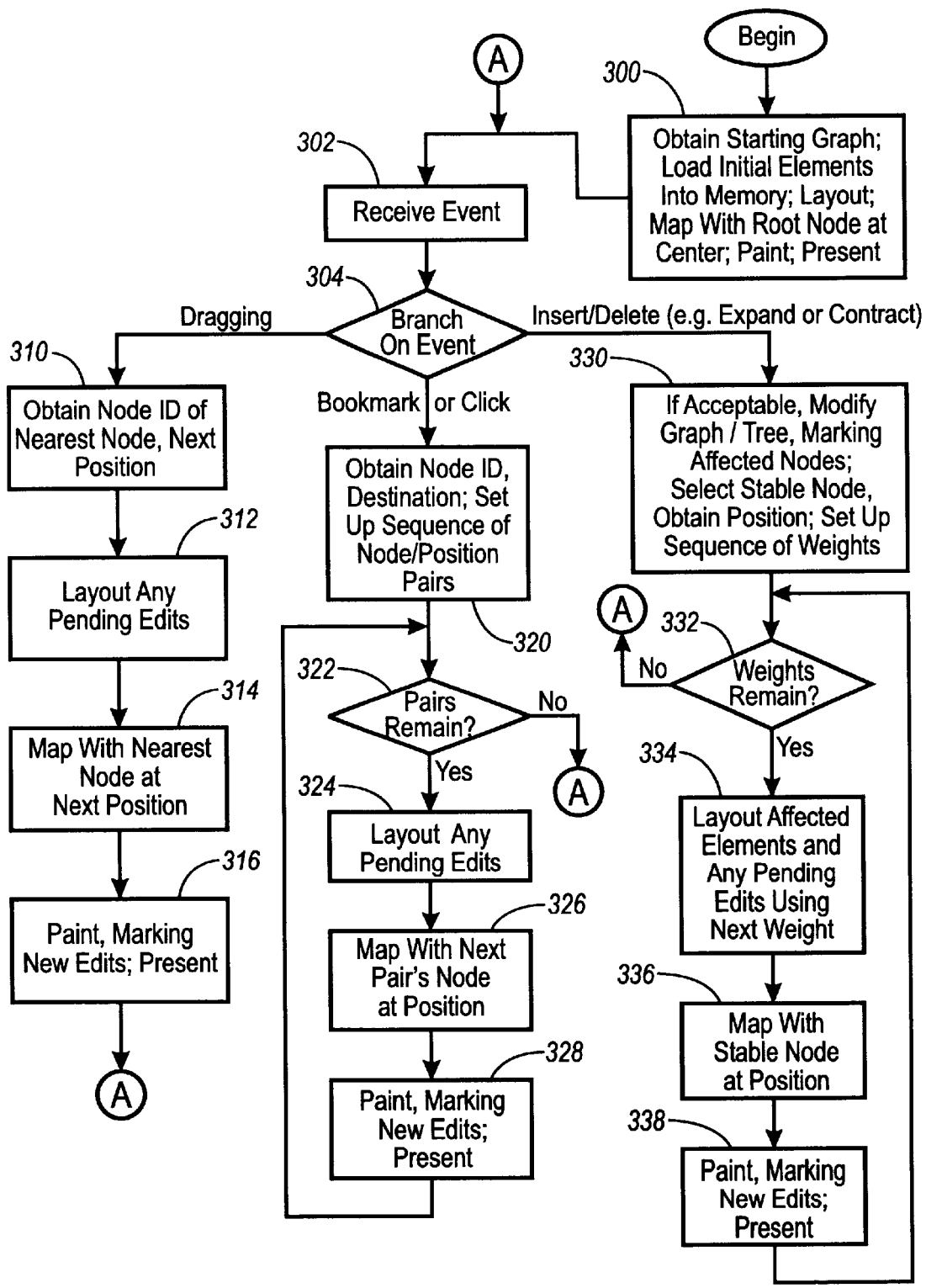
FIG. 5 is a flow chart showing how the system of FIG. 4 can respond to events by presenting representations of a directed graph.

FIG. 5 shows how the system of FIG. 4 can respond to events by presenting representations of a graph.

In box 300, client 212 begins by obtaining a starting graph and by loading an initial set of elements into memory, such as through calls to create nodes as described in copending coassigned U.S. patent application Ser. No. 09/124,471, entitled "Controlling Which Part of Data Defining a Node-Link Structure is in Memory", incorporated herein by reference. Expansion flags define a tree within the initial set of elements, as described in copending coassigned U.S. patent application Ser. No. 09/124,338, entitled "Node-Link Data Defining a Graph and a Tree Within the Graph", incorporated herein by reference. Client 212 also makes appropriate calls to routines in memory 214 for layout of the tree in a hyperbolic plane, for mapping the tree from the hyperbolic plane to a unit disk with the root node at the disk center, for painting the mapped tree, and for presentation of the painted version on display 204 by swapping a double buffer, all in box 300.

In box 302, client 212 receives an event relating to the graph. The event could result from a navigation signal, an editing signal, or another type of signal from a user. Alternatively, the event could be received from another source, either within or external to system 200. In either case, the event could take the form of a call from within client 212, from one of the routines in memory 214, or from other instructions executed by processor 202. A series of received events could be held in a queue, so that box 302 could involve popping an event from a queue.

In response to the event received in box 302, client 212 initiates an appropriate response by making one or more calls to routines in memory 214. As indicated by box 304, the response depends on the type of event, so that a branch is taken based on the event.

The event may be a non-animated event, such as an orientation shift event, a stretch event, or a dragging event. An orientation event can result when the user indicates a new orientation for the root node. A stretch event can result when the user indicates a new stretch factor for the displayed representation. A dragging event, for example, can result when the user selects a position within the representation, such as by a mouse down click, and requests that it be moved by an appropriate gesture or other signal.

Client 212 begins the response to a non-animated event in box 310 by obtaining any information needed for responding to the event. For an orientation event, the information obtained in box 310 can include the new orientation. For a stretch event, the information obtained in box 310 can include the new stretch factor.

For a dragging event, obtaining information in box 310 is somewhat more complicated. Client 212 could obtain a node identifier (node ID) of the node nearest the selected position and could also obtain information about the requested motion. These items of information could be obtained in much the same way as illustrated by the function find-nearest-node described at cols. 71–72 and as described in relation to FIG. 14 of U.S. Pat. No. 5,590,250, incorporated herein by reference.

When client 212 has obtained the necessary information in box 310, it can conclude with appropriate calls to walker routines 222 and painter routines 224 for layout, mapping, and painting. For an orientation event, the root node must be laid out at the new orientation. For a stretch event or a dragging event, layout is not needed. For a stretch event, the call to walker routines 222 must, however, include the new stretch factor, for use in mapping. Similarly, for a dragging event, the call to walker routines 222 must include the node ID of the nearest node and the next position along the path of motion, for use in mapping.

In box 312, walker routines 222 could first perform any necessary layouts in the hyperbolic plane, and could also lay out any pending edits of the tree, in the manner described in copending coassigned U.S. patent application Ser. No. 09/124,805, filed Jul. 29, 1998, entitled "Local Relative Layout of Node-Link Structures in Space with Negative Curvature", incorporated herein by reference. Then, in box 314, walker routines 222 could map the tree into the unit disk, beginning with a starting node and a starting position. For example, in response to a dragging event, the starting node could be the nearest node identified in box 310 and the starting position could be the next position along the path of motion. The starting node and starting position previously used for mapping could be used in response to an orientation or stretch event.

When the tree has been mapped, painter routines 224 can be called to paint the mapped tree in a display buffer, in box 316. During painting, painter routines 224 can mark new edits that occur in the tree as a result of node creation as described in copending coassigned U.S. patent application Ser. No. 09/124,338, entitled "Node-Link Data Defining a Graph and a Tree Within the Graph", incorporated herein by reference. Each edit can be marked by setting a flag or storing other appropriate data. When painting is completed, a swap of display buffers can be performed to present the tree as painted, thus providing a representation of the graph.

As noted above, these events are currently implemented as non-animated events. In response to an orientation event, the representation pivots to the new orientation, typically around the node at the focus of the display region. Similarly, in response to a stretch event, the representation expands or contracts radially, typically around the node at the focus. In response to a dragging event, the representation moves at a rate determined by the input signal. Client 212 could, however, provide an animated response to an orientation event, a stretch event, or a dragging event by converting the requested change into an equivalent sequence of smaller events, and issuing a series of calls in box 310, one call for each of the smaller events.

FIG. 5 also illustrates responses to two different types of events which are always treated as animated in the current implementation. The first type is a bookmark or click event, in response to which one node's position is moved during an animated sequence and other elements move to accommodate the one node's movement. The second type is an insert/delete event, in response to which one node remains stable during an animated sequence in which some elements are contracted, others are expanded, and still others move to accommodate the contractions and expansions.

A bookmark or click event could result when the user selects an item in a menu or other collection of bookmarks or selects a position within the representation with a mouse down-up click. In response to an event of this type, client 212 obtains a node ID and a destination position in the unit disk. In the case of a bookmark event, the node ID and destination position are previously stored and can be retrieved from memory. In the case of a click event, client 212 could obtain a node ID of the node nearest the selected position in much the same way as the function find-nearest-node described at cols. 71–72 of U.S. Pat. No. 5,590,250, incorporated herein by reference, and the destination could be a default position, such as the center of the unit disk.

In box 320, client 212 could call walker routines 222 with the node ID and destination position. Walker routines 222 can respond by performing an animation loop to present a sequence of representations in which the node moves from its previous position to the destination position. In box 320, walker routines 222 begin by setting up a sequence of node/position pairs, each including the node ID and a position in the unit disk. The positions can be obtained by obtaining a total translation from the previous position to the destination position, then obtaining and repeatedly composing an nth root of the total translation with a current translation as described in relation to boxes 470, 472, and 482 in FIG. 12 of U.S. Pat. No. 5,619,632, incorporated herein by reference. The number of node/position pairs can be large enough to ensure a smooth animation from the previous position to the destination position, with features representing elements of the structure maintaining object constancy during the animation. As an alternative to the nth root approach, the positions could be obtained by selecting an appropriate number of points along an appropriately chosen arc in the hyperbolic plane from the previous position to the destination position. The arc could be chosen to compromise between a straight line, which can appear unnatural, and the arc the node would have taken in the nth root method, which can require an excessive number of animation steps to appear smooth. The number of points could be chosen to ensure satisfactory animation.

Walker routines 222 then perform an iteration of the animation loop for each node/position pair in the sequence, as indicated in box 322. In box 324, walker routines 222 could first lay out in the hyperbolic plane any pending edits of the tree, as described above in relation to box 312. Then, in box 326, walker routines 222 could map the tree into the unit disk, beginning with the node and position from the next node/position pair as the starting node and the starting position, as described above in relation to box 314.

When the tree has been mapped, painter routines 224 can be called to paint the mapped tree in a display buffer, in box 328. During painting, painter routines 224 can mark new edits that occur in the tree as a result of node creation as described above in relation to box 316. When painting is completed, a swap of display buffers can be performed to present the tree as painted, thus providing a representation of the graph.

When a new edit is marked in box 328 by painter routines 224, the new edit is laid out during the next iteration, in box 324. As a result, the animated sequence of representations, rather than showing a static node-link structure as in U.S. Pat. No. 5,629,632, shows a dynamic node-link structure. The edits, however, serve primarily to add features representing new nodes along the outer perimeter of the representation as the representation makes the transition from the previous position to the destination position. As a result, the added features do not interfere with or reduce the perception of object constancy for features representing other elements.

An insert/delete event could result when the user requests expansion or contraction of a node or requests some other modification of the graph or the tree. An insert/delete event could also be received in the form of a call, and could thus provide a mechanism for automatic modification of the graph or tree without concurrent human control.

In response to an event of this type, client 212 can first make appropriate calls to routines in memory 214 to determine whether the requested modification of the graph or tree is acceptable, in box 330. For example, a technique for determining whether an expand signal is acceptable is described in relation to FIG. 7 of copending coassigned U.S. patent application Ser. No. 09/124,338, entitled "Node-Link Data Defining a Graph and a Tree Within the Graph", incorporated herein by reference.

If the requested modification of the graph or tree is acceptable, client 212 can modify the graph or tree accordingly, making calls to routines in memory 214 as necessary. In the process of making the modification, each element that could be inserted, deleted, or changed by the modification, referred to herein as an "affected element", is marked, such as by setting a flag or storing other appropriate data. If a node is selected by an expand signal or a contract signal, its parent is also an affected node, because the area allocated to the parent may change. For most other insert/delete events, only nodes that are inserted or deleted are affected. Client 212 can then select a node as a stable node to be held at its previous position during animated presentation of the modification.

In many cases, the starting node used previously in mapping can be selected as the stable node, and it can be held at the previous starting position. In other cases, it may be desirable for client 212 to select a different stable node; for example, a node that is being expanded could be selected as the stable node, to be held at its current position, which thus becomes the new starting position. Therefore, unless client 212 selects a different stable node, the previous starting node and starting position are usually retained. But where the previous starting node is being deleted, another node must be selected as the default stable node subject to change by client 212.

When a deletion is being made, walker routines 222 can be called with the node IDs of the node being deleted and of its closest ancestor that will remain in the tree being mapped after deletion. This ancestor can be found by walking upward from the node being deleted until an ancestor is reached that is not being deleted by the current insert/delete event.

In response to this call, walker routines 222 can test whether the node being deleted is the previous starting node. If so, the identified ancestor can be selected to replace it as the starting node. If the ancestor has been recently mapped to a position that is displayed and that is available, that position can be selected as the starting position. If the ancestor has not been recently mapped, or was mapped to a position that is not displayed or that is not available because another element has now been mapped there, the starting position can be the center of the unit disk.

Also in box 330, client 212 could call walker routines 222 with the stable node ID and position. Walker routines 222 can respond by performing an animation loop to present a sequence of representations in which, first, deleted nodes are contracted at their previous positions, and then inserted nodes are expanded at their new positions, all while the stable node is held at its previous position. If the stable node cannot be held at its previous position because it was not recently mapped or was mapped to a position that is not displayed or is not available, it can be shifted to that position after deleted nodes are contracted with the previous starting node at the previous starting position, resulting in a sudden movement between contraction and expansion. Walker routines 222 begin by setting up a sequence of weights to govern the rate at which the area allocated to each affected node changes during contraction and expansion. The weights are separated by sufficiently small increments to preserve object constancy during animation.

Walker routines 222 then perform an iteration of the animation loop for each weight in the sequence, as indicated in box 332. In box 334, walker routines 222 could first lay out in the hyperbolic plane the affected nodes and any pending edits of the tree, using the iteration's weight in the manner described in copending coassigned U.S. patent application Ser. No. 09/124,338, entitled "Local Relative Layout of Node-Link Structures in Space with Negative Curvature", incorporated herein by reference. Then, in box 336, walker routines 222 could map the tree into the unit disk, beginning with the stable node and position, as described above in relation to box 314.

When the tree has been mapped, painter routines 224 can be called in box 338 to paint the mapped tree in a display buffer. During painting, painter routines 224 can mark new edits that occur in the tree as a result of node creation as described above in relation to boxes 316 and 328. When painting is completed, a swap of display buffers can be performed to present the tree as painted, thus providing a representation of the graph.

Whether there are pending edits or not, a series of iterations of the animation loop beginning in box 332 produces representations of a dynamic node-link structure because of the deletions and/or insertions. In addition, affected elements move to new positions from their positions prior to the deletions and insertions. The technique has been successfully implemented to produce object constancy during these movements.

After a representation is provided in box 316 or after an animation sequence is completed in box 322 or 332, another event can be received in box 302, as indicated by the circles labeled "A" in FIG. 5.

Animation details relating to the loops that begin in boxes 322 and 332 are discussed in more detail in copending coassigned U.S. patent application Ser. No. 09/124,528, filed Jul. 29, 1998, entitled "Presenting Node-Link Structures with Modification", incorporated herein by reference.

C.3. Mapping

Figure 6:
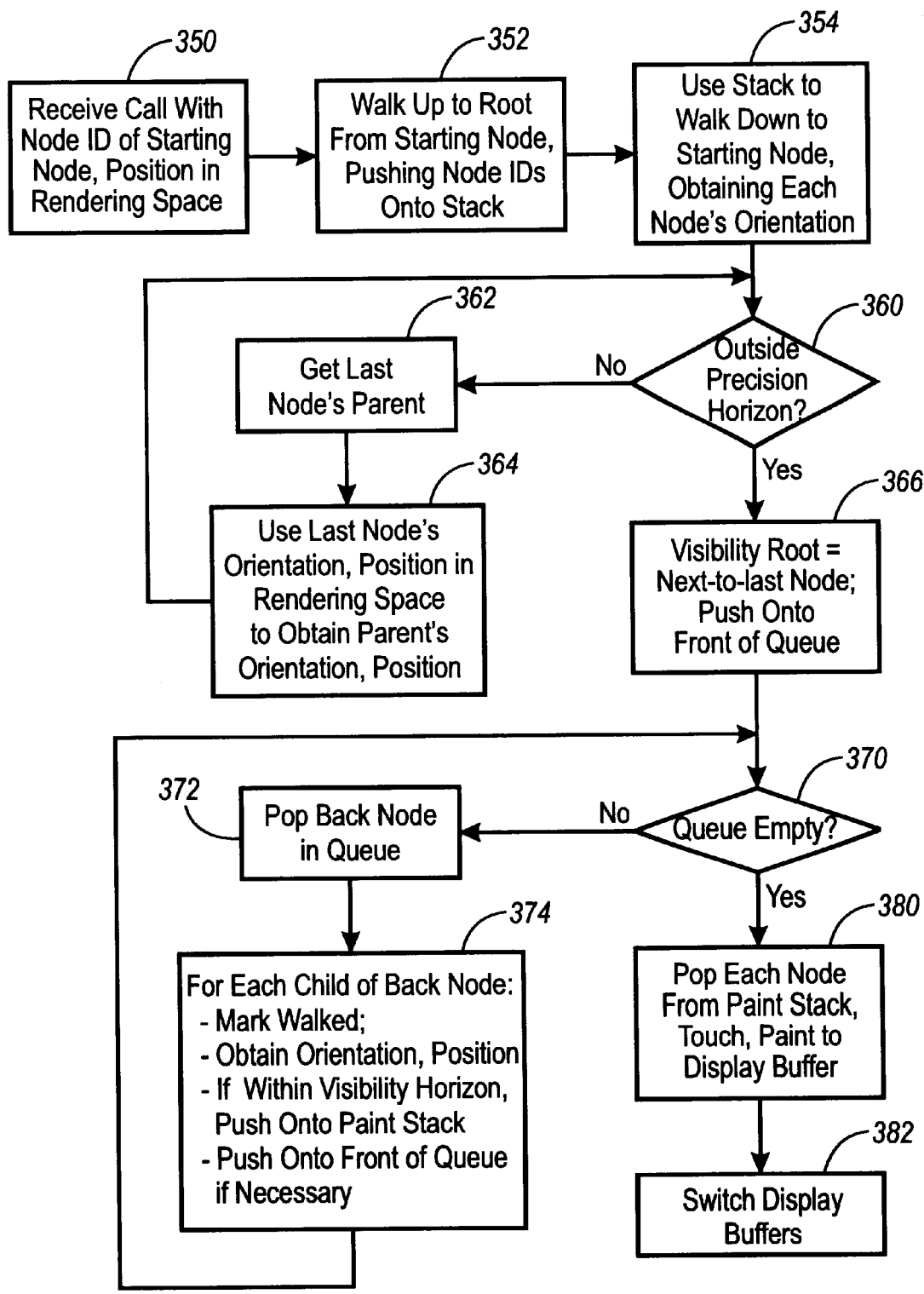
FIG. 6 is a flow chart showing how mapping can be performed in FIG. 5.

FIG. 6 shows how mapping can be performed in boxes 314, 326, and 336 in FIG. 5. As shown in box 350, mapping begins upon receiving a call that includes the node ID of a starting node and a starting position in rendering space.

Figure 7:
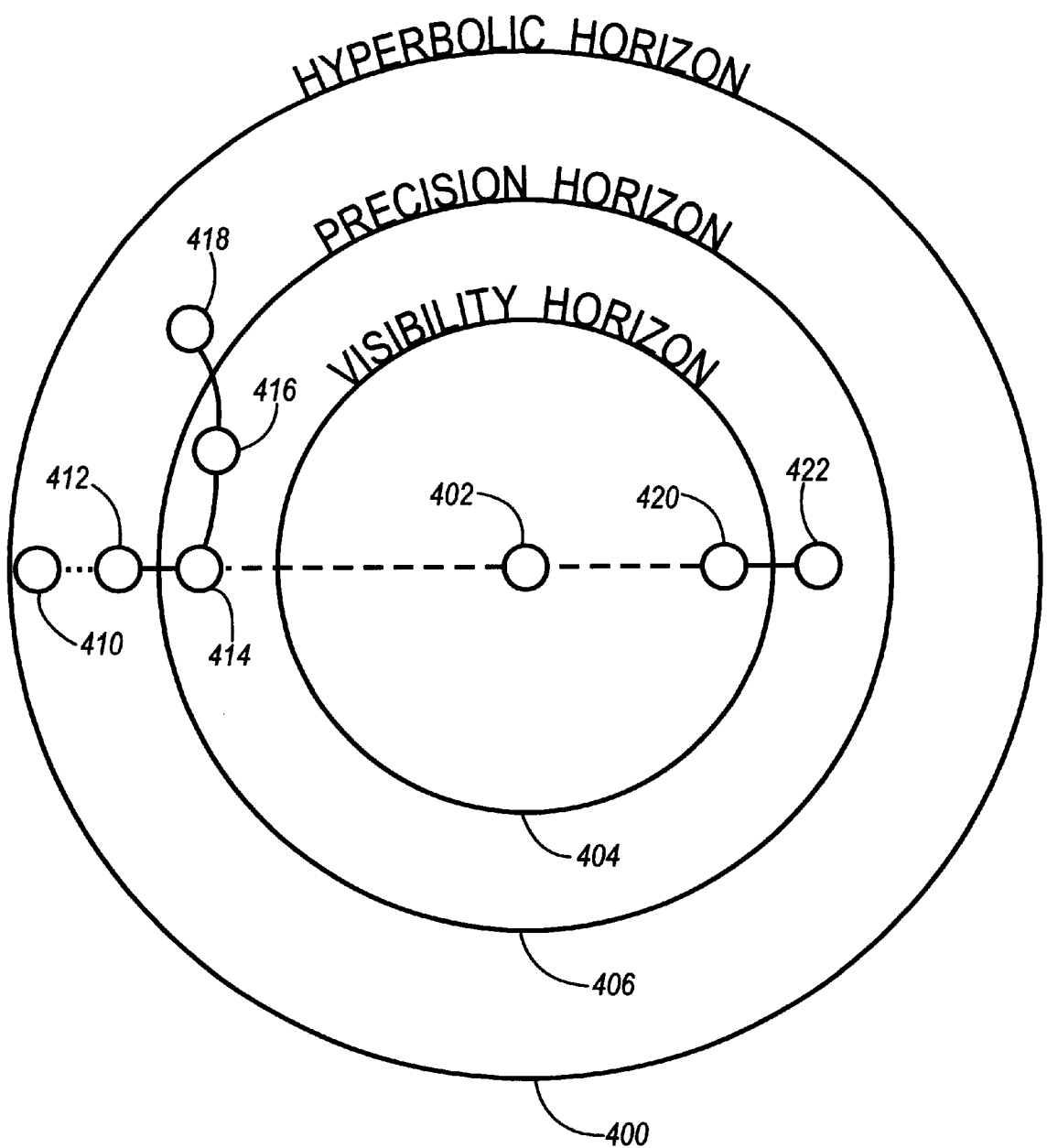
FIG. 7 is a schematic diagram showing a distorted representation of the unit disk.

The overall strategy of the technique in FIG. 6 can be understood from FIG. 7, showing a distorted representation of the unit disk onto which the hyperbolic plane can be mapped. The area near the perimeter of the unit disk is expanded to show positions of nodes that would not otherwise be distinguishable.

The unit disk is bounded by hyperbolic horizon 400, which can be thought of as the asymptotic limit of the mapping of the hyperbolic plane. Starting node 402 is illustratively mapped to the center of the unit disk, and is therefore the part of the hyperbolic plane that has the greatest detail in the unit disk. Starting node 402 could, however, be mapped to any position on the unit disk.

Between starting node 402 and hyperbolic horizon 400 are two other horizons, visibility horizon 404 and precision horizon 406. A node outside visibility horizon 400 is not painted in boxes 316, 328, or 338 in FIG. 5, and is therefore not visible to a user. As discussed below, precision horizon 406 is helpful in avoiding precision problems during mapping. Such problems can arise because, as illustrated, root node 410 can be many generations above starting node 402.

In the example shown in FIG. 7, the technique of FIG. 6, in box 352, would first walk up a path in the tree from starting node 402 to root node 410. During this walk, the technique would push the node ID of each node in the path onto a stack. Then, in box 354, the technique would use the stack to walk back down the path to starting node 402. On this downward walk, the technique would start with an original orientation and position of root node 410 and obtain the orientation and position of each child node along the path.

The technique can begin obtaining a child's orientation by combining the orientation of its parent with the child's incoming difference angle, referred to herein as its "DAngle". A child node's DAngle can be the difference between the extension of its parent's incoming link and the outgoing link from the parent to the child. To combine two values that are orientations or angles, a function can be used that is similar to the function "rotate-direction" at columns 67 and 68 of U.S. Pat. No. 5,590,250, incorporated herein by reference. This function, referred to herein as "RotateDirection" and also used for other purposes as discussed below, starts at a direction indicated by coordinates (x, y) of a point on the unit disk perimeter with an angle e and obtains a new direction with coordinates $(x\cos\theta - y\sin\theta, y\cos\theta + x\sin\theta)$.

During the downward walk, then, RotateDirection is called with each node's orientation, expressed as a direction (x, y), and with the DAngle $\theta$ of the node's child. RotateDirection returns the combined orientation, expressed as a direction, based on the calculation set forth above.

The child's position and orientation can then be found using a function similar to the function "move-in-direction" at columns 67 and 68 of U. S. Pat. No. 5,590,250, incorporated herein by reference. This function, referred to herein as "MoveInDirection" and also used for other purposes as discussed below, starts at a position ("pt") in the hyperbolic plane, moves in a direction ("dir") for a distance ("dist") to obtain a new position ("newpt") and a new direction ("newdir"). The values for pt, dir, newpt, and newdir are expressed as complex numbers.

MoveInDirection can be implemented by multiplying (dir*dist) to obtain a vector ("vec"). The values for newpt can then be obtained by dividing the sum (vec+pt) by the sum of (1, 0) and the product of vec and the conjugate of pt. The values for newdir can then be obtained in two stages. In the first stage, values for a temporary variable ("temp") are obtained by dividing the sum (dir+pt) by the sum of (1, 0) and the product of dir and the conjugate of pt. Then, in the second stage, values for newdir are obtained by dividing the difference (temp-newpt) by the difference between (1, 0) and the product of temp and the conjugate of newpt.

To obtain the child's position and orientation, MoveInDirection is called with the parent node's position (pt), with the negative of the combined orientation from RotateDirection (dir), and with the parent node's distance to the child (dist). The position (newpt) returned by MoveInDirection is the child node's position. The direction returned by MoveInDirection (newdir) is the child node's orientation.

The original orientation of root node 410 can be indicated by an initialized value or a value indicated by a user signal. The initialized value, can, for example, be vertically upward (0, 1). The user can indicate another value as an angular offset from horizontally rightward (1, 0). The original position of root node 410 can be the origin (0, 0) of the unit disk.

Upon completion of the downward walk in box 354, sufficient information has been obtained to locate the starting node in the rendering space. This can be done in preparation for an iterative upward walk, described below. If the starting node is the root, no further computation is necessary, because the orientation and position already obtained are satisfactory. For other nodes, the orientation from MoveInDirection can be corrected by finding a test position near the node's original position in the hyperbolic plane (i.e. its position when the root node is at the origin with the current orientation), by transforming the test position to a destination in the same way the node's original position is transformed to the node's position from MoveInDirection, by then transforming the test position's destination in the same way the node's position from MoveInDirection is transformed to the origin, and by normalizing the result to obtain the node's corrected orientation.

Beginning again at starting node 402, the technique would iteratively walk back up the same path until the test in box 360 determines that a node has been reached with a position outside precision horizon 406 or that root node 410 has been reached. In each iteration, box 362 would begin by getting the parent of the last node. Box 364 would then use the last node's orientation and position on the unit disk, together with the last node's position relative to its parent node in the hyperbolic plane, to obtain the parent node's orientation and position on the unit disk.

To obtain the parent node's orientation and position, MoveInDirection is first called with the child node's position (pt), with the negative of the child node's orientation (dir), and with the parent node's distance to the child (dist). The position (newpt) returned by MoveInDirection is the parent node's position. The negative of the direction returned by MoveInDirection (newdir) is then provided in a call to RotateDirection, together with the child's DAngle, to obtain the parent node's orientation.

To perform the test in box 360, and similar tests elsewhere, the coordinates of a node's position on the unit disk are squared, and the sum of the squares can then be compared with the positions of visibility horizon 404 or precision horizon 406, as appropriate. For example, the sum of the squares could be compared with the squares of the radii to visibility horizon 404 and precision horizon 406. If the sum of squares is less than the square of the radius to visibility horizon 404, the node is visible; if the sum of squares is less than the square of the radius to precision horizon 406, the node could be the visibility root. The node chosen as the visibility root can be the highest node reachable on an upward walk from the starting node that is within precision horizon 406.

When the test in box 360 is met, such as by node 412 in FIG. 7, the technique takes the next-to-last node as a visibility root, in box 366. In FIG. 7, node 414 is thus the visibility root, meaning that only its descendants will be mapped, thus reducing the number of generations that will be mapped. Because the number of generations is reduced, precision problems can also be significantly reduced, especially in the case where there are many generations between visibility root 414 and root node 410.

Where root node 410 is within the precision horizon, root node 410 is taken as the visibility root in box 366.

Also in box 366, the technique of FIG. 6 pushes the node ID of the visibility root onto a queue in preparation for a breadth-first iterative walk down the tree. As indicated in box 370, this walk continues until the queue is empty. In each iteration, box 372 pops the back node of the queue. Then, in box 374, the technique performs several acts in relation to each child of the popped back node. Each child node is marked walked, such as by storing a counter value for the current walk. The orientation and position of the child node on the unit disk are obtained. If the child node's position is inside visibility horizon 404, the node ID of the child node is pushed onto a paint stack. Finally, the child node is pushed onto the front of the queue so that its children will in turn be mapped, but only if the child node meets an appropriate criterion that helps to avoid unnecessary mapping.

To obtain the child node's orientation and position, RotateDirection is called with the parent node's orientation and with the child node's DAngle. The resulting direction is then provided in a call to MoveInDirection, together with the parent node's position and the parent node's distance. The position (newpt) and the direction (newdir) obtained from MoveInDirection are the child node's position and orientation, respectively.

When the child node's position and orientation are obtained, a criterion can be applied to determine whether it is necessary to map the child node's children. One criterion that has been successfully applied to avoid unnecessary mapping is that the child node must meet the following condition: It must have children in the graph; it must be the to-node of a link that is expanded so that its children are also in the tree; it must be inside precision horizon 406; and either it is inside visibility horizon 404 or its parent is outside visibility horizon 404. For example, applying this criterion in FIG. 7, the technique would walk from node 414 to node 416 and then to node 418 before stopping, because node 408 is outside precision horizon 406. Similarly, the technique would walk from node 402 through intermediate nodes to node 420, then to node 422 before stopping, because node 422 is outside visibility horizon 404 but its parent, node 420, is inside visibility horizon 404.

Alternatively, the technique of FIG. 6 could use another appropriate criterion to determine in box 374 whether to push a node onto the queue so that its children are mapped during a subsequent iteration.

Box 374 can also include other appropriate operations. For example, the distance from a child node's position to hyperbolic horizon 400, computed as described above in relation to box 360, can be used to determine whether the node is sufficiently far from visibility horizon 404 to be painted. If so, additional calculations can be made to obtain the center of the feature representing the node and the feature's height and width.

When the queue is empty, the technique can then pop each node from the paint stack, in box 380. A call can be made to painter routines 224 to touch the node and to paint it to a display buffer. In the course of painting nodes, painter routines 224 also paint appropriate links to the display buffer. Painting of nodes and links involves mapping from the unit disk to a display region, which can be implemented as described in relation to FIGS. 11–13 of U.S. Pat. No. 5,590,250, incorporated herein by reference. Painting can be performed first for links, then for children, then for parents. Painter routines 224 can also indicate visually the direction from starting node 402 toward root node 410, such as with a color cue, because it is an important direction in navigation—it is the only direction that leads upward and sideways in the tree, since all other directions lead downward in the tree.

In touching a node, painter routines 224 can initiate node creation as described in relation to FIG. 8 of copending coassigned U.S. patent application Ser. No. 09/124,338, entitled "Node-Link Data Defining a Graph and a Tree Within the Graph", incorporated herein by reference. Painter routines 224 can also mark each newly created node as a new edit. As a result, the newly created nodes will subsequently be laid out, in box 312, 324, or 334 in FIG. 5.

When painting is completed, the display buffer can be switched in box 382 so that its contents are presented on display 204, resulting in presentation to the user of a representation of the graph.

The technique of FIG. 6 has been successfully implemented with visibility horizon 404 having a radius of approximately 0.9933 of the radius of hyperbolic horizon 400. The radius of precision horizon 406 can then be appropriately chosen between the radii of visibility horizon 404 and hyperbolic horizon 400. For example, precision horizon 406 can have a radius that is approximately 0.9995 of the radius of hyperbolic horizon 400.

C.5. Variations

The implementation described above could be varied in many ways within the scope of the invention.

An implementation similar to that described above has been successfully executed on processors of IBM compatible PCs, but implementations could be executed on other machines with any appropriate processors.

An implementation similar to that described above has been successfully executed using C++ in 32-bit Windows environments, but other programming languages and environments could be used, including non-object-oriented environments, and other platforms could be used, such as Lisp, a Unix environment, ANSI C, Pascal, and so forth.

An implementation similar to that described above has been successfully executed with node-link data presented in an XML-compliant format and in an experimental format, but the invention could be implemented with any suitable type of node-link data, whether static or dynamic, and accessible in any appropriate way, such as in memory or over a network.

An implementation similar to that described above has been implemented with each iteration preparing and presenting one representation or an animated series of representations of a graph in response to a navigation signal, but the invention could be implemented with other types of iterations invoked by other types of signals or calls.

An implementation similar to that described above has been successfully executed with navigation signals received from a keyboard and mouse and relating to a displayed representation or animated series of representations of a node-link structure like the representations disclosed in Lamping et al., U.S. Pat. No. 5,619,632 and in copending coassigned U.S. patent application Ser. No. 09/124,528, entitled "Presenting Node-Link Structures with Modification", both incorporated herein by reference. The invention could, however, be implemented with or without navigation signals; for example, elements could be moved around in response to different sortings of the children of a node or in response to the application of different filters to elements of a structure. Also, the invention could be implemented with any appropriate type of expand and contract signals or other navigation signals, including signals resulting from external queries, selection of a menu entry-like item requesting expansion below an indicated node or link, or selection of a menu entry-like item requesting expansion below the current focus. The navigation signals could instead relate to an illusory space like those produced by videogames or virtual reality environments or a presentation space other than a display and navigation signals could instead be produced by any appropriate user input device, including other kinds of pointing devices and other kinds of devices for receiving alphanumeric or linguistic input such as voice, gestures, or other modes of user input. Further, the invention could be implemented with other types of representations of node-link structures. The invention could be implemented without animation or with any appropriate animation techniques.

The implementation described above maps a node-link structure laid out in the hyperbolic plane in accordance with copending coassigned U.S. patent application Ser. No. 09/124,805, entitled "Local Relative Layout of Node-Link Structures in Space with Negative Curvature", incorporated herein by reference, and maps the structure into the unit disk, but the invention could map a node-link structure laid out in any appropriate way in any appropriate negatively curved space, and could map it into any appropriate rendering space.

The implementation described above maps from the hyperbolic plane into the unit disk, based on paths of nodes from a starting node. The invention could also be implemented for mapping from any other appropriate negatively curved space to an appropriate rendering space, and could map based on paths of links or on paths combining nodes and links.

The implementation described above uses data indicating a node's position relative to its parent in a particular way, with position displacement and angle displacement, but the invention could be implemented with data indicating relative position to an element related in any other appropriate way, such as a child or a sibling, and relative position could be indicated with other combinations of displacements or in any other appropriate way.

The implementation described above obtains data identifying a starting node and a starting location based on a signal from a user, but data identifying other elements of a node-link structure could be obtained, and data identifying nodes or other elements and starting locations could be obtained in other ways, such as from a call from code being executed.

The implementation described above applies a specific criterion to determine whether to map a node's descendants, but the invention could be implemented by mapping all descendants of each mapped node or by applying any other suitable criterion to determine which elements to map.

The implementation described above is suitable for mapping elements of a tree. The invention could be used to map elements of other types of node-link structures, such as graphs in general.

The implementation described above uses node-link data that include expansion flags of links to define a tree within a graph as disclosed in copending coassigned U.S. patent application Ser. No. 09/124,338, entitled "Node-Link Data Defining a Graph and a Tree Within the Graph" with memory management as disclosed in copending coassigned U.S. patent application Ser. No. 09/124,474, entitled "Controlling Which Part of Data Defining a Node-Link Structure is in Memory", both incorporated herein by reference, but the invention could be implemented with a node-link structure defined in any other appropriate way, and loaded into memory in any appropriate way.

The implementation described above selects a mapping root employing a precision horizon that is a fixed distance from the hyperbolic horizon in relation to the radius of the unit disk. The invention could be implemented by mapping from the root element or from another appropriate element of a node-link structure. A criterion other than a precision horizon could thus be used to select a mapping root, and a precision horizon could be defined in any appropriate way.

The implementation described above employs a directed graph data structure in which a link is represented as an item in two linked lists, one for the outgoing links from its from-node and one for the incoming links to its to-node. Any other suitable data structure could be employed.

The implementation described above can handle directed graphs, including cyclic directed graphs, but the invention could be implemented for other types of graphs by converting other types of links to appropriate combinations of directed links or by otherwise providing a protocol for mapping the structure of a graph to a tree. For example, undirected link between two nodes could be converted to a pair of directed link, between the same nodes or could be assigned a direction based on an appropriate criterion. In general, a representation in which all undirected links have been converted to a pair of directed links is likely to be visually confusing, because each pair of directed links results in a cycle, but this confusing might be overcome by presenting cycles in another way.

In the implementation described above, acts are performed in an order that could in many cases be modified. For example, a depth-first walk rather than a breadth-first walk could be performed in FIG. 6, and each node could be painted immediately after it is mapped to the rendering space rather than after all nodes have been mapped.

Also, in the implementation described above, several software portions are distinguished, such as grapher, walker, painter, and math routines and the client, but the invention could be implemented with other combinations of hardware and software and with software organized in any appropriate way.

D. Applications

The invention has been applied in providing an interactive browser of node-link structures. The invention could be applied in a variety of contexts in which node-link structures are visualized. In particular, the invention could be applied in visualizing web-related structures such as the structure formed by a cached set of web pages or other web objects.

More generally, the invention could be applied to provide a browser for organization charts, file system hierarchies, hypertext hierarchies, world wide web connectivity structures, parts breakdowns, SGML structures, or any other large node-link structures. The browser could be used in editing structures or their contents.

E. Miscellaneous

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method of mapping a node-link structure laid out in a space with negative curvature into a rendering space; the method comprising:

(A) obtaining data identifying a starting element within the structure, the starting element being identified from a plurality of possible starting elements in the structure;

(B) locating the starting element at a starting position in the rendering space; and (C) for each of a set of other elements in the structure, mapping the element's position in the negatively curved space to a position in the rendering space; the set of other elements including at least a parent and a child of the starting element; each element in the set of other elements being reachable from the starting element by a path leads only through elements in the set; each element's path including a preceding element that immediately precedes the element in the path;

the act of mapping in (C) comprising, for each element in the set of other elements, using the element's position relative to the preceding element in the negatively curved space and the position of the preceding element in the rendering space to obtain the element's position in the rendering space.

2. A method as in claim 1, further comprising:

(D) using the positions of elements in the rendering space from (B) and (C) to present a representation of the node link structure in a display region, positions in the rendering space corresponding to positions in the display region, the starting position corresponding to a focus of the display region.

3. A method as in claim 2 in which the display region is a circle, the starting position corresponding to the circle's center.

4. A method as in claim 1 in which the space with negative curvature is the hyperbolic plane.

5. A method as in claim 1 in which (A) comprises:

presenting a representation of the node-link structure in a display region;

receiving a signal from a user indicating a position in the display region;

converting the position in the display region to a position in the rendering space; and using the position in the rendering space to obtain data identifying the starting element.

6. A method as in claim 1 in which (A) comprises:

receiving a signal from a user that indicates the starting element; and using the signal to obtain data identifying the starting element.

7. A method as in claim 6 in which the signal also indicates the starting position.

8. A method as in claim 1 in which (A) comprises:

receiving a signal from a user requesting a change in the node-link structure; and obtaining data identifying a starting element that is not affected by the requested change.

9. A method as in claim 8 in which (B) comprises locating the starting element at its previous position in the rendering space.

10. A method as in claim 1 in which the node-link structure is a tree with a root element and in which (B) comprises:

walking up from the starting element to the root element to obtain identifiers of elements on a path from the starting element to the root element; and using the identifiers of elements on the path to walk down from the root element to the starting element, using a starting orientation of the root element to obtain an orientation of the starting element in the rendering space.

11. A method as in claim 1 in which the node-link structure is a directed graph, the rendering space has a bounded precision region within which elements can be mapped with adequate precision, the starting position is within the precision region, and (C) comprises:

(C1) walking up from the starting element on an upward path, mapping each element on the upward path to a position in the rendering space until a first element is mapped to a position outside the bounded precision region;

(C2) selecting a second element preceding the first element on the upward path as a mapping root, the second element being within the precision region; and (C3) walking downward from the mapping root and mapping the set of other elements to positions in the rendering space; the set of other elements including only the mapping root and descendants of the mapping root.

12. A method as in claim 11 in which the first and second elements are nodes, the second element being a node immediately preceding the first element on the upward path.

13. A method as in claim 11 in which (C3) comprises:

for each element that is mapped in (C3), applying a criterion to determine whether it is necessary to map descendants of the element.

14. A method as in claim 13 in which applying the criterion includes determining whether the element has descendants in the node-link structure.

15. A method as in claim 13 in which applying the criterion includes determining whether the element is in the precision region.

16. A method as in claim 13 in which the rendering space has a bounded active region within the precision region, the starting position is within the active region, and applying the criterion includes determining whether the element is inside the active region or the element's parent is outside the active region.

17. A system comprising:

a processor for mapping a node-link structure laid out in a space with negative curvature into a rendering space; the processor; in mapping the node-link structure:

obtaining data identifying a starting element within the structure, the starting element being identified from a plurality of possible starting elements in the structure;

locating the starting element at a starting position in the rendering space; and for each of a set of other elements in the structure, mapping the element's position in the negatively curved space to a position in the rendering space; the set of other elements including at least a parent and a child of the starting element; each element in the set of other elements being reachable from the starting element by a path that leads only through elements in the set; each element's path including a preceding element that immediately precedes the element in the path;

in mapping the position of each element in the set of other elements, the processor using the element's position relative to the preceding element in the negatively curved space and the position of the preceding element in the negatively curved space and the position of the preceding element in the rendering space and the position of the preceding element in the rendering space to obtain the element's position in the rendering space.

18. An article of manufacture for use in a system that includes:

a storage medium access device; and a processor connected for receiving data accessed on a storage medium by the storage medium access device;

the article of manufacture comprising;

a storage medium; and instruction data stored by the storage medium; the instruction data indicating instructions the processor can execute; the processor, in executing the instructions, mapping a node-link structure laid out in a space with negative curvature into a rendering space; the processor, in mapping the node-link structure:

obtaining data identifying a starting element within the structure, the starting element being identified from a plurality of possible starting elements in the structure;

locating the starting element at a starting position in the rendering space; and for each of a set of other elements in the structure, mapping the element's position in the negatively curved space to a position in the rendering space; the set of other elements including at least a parent and a child of the starting element; each element in the set of other elements being reachable from the starting element by a path that leads only through elements in the set; each element's path including a preceding element that immediately precedes the element in the path;

in mapping the position of each element in the set of other elements, the processor using the element's position relative to the preceding element in the negatively curved space and the position of the preceding element in the negatively curved space and the position of the preceding element in the rendering space to obtain the element's position in the rendering space.

19. A method of transferring data between first and second machines over a network, the second machine including memory and a processor connected for accessing the memory; the memory being for storing instruction data; the method comprising:

establishing a connection between the first and second machines over the network; and operating the first and second machines to transfer instruction data from the first machine to the memory of the second machine; the instruction data indicating instructions the processor can execute; the processor, in executing the instructions, mapping a node-link structure laid out in a space with negative curvature into a rendering space; the processor, in mapping the node-link structure:

obtaining data identifying a starting element within the structure the starting element being identified from a plurality of possible starting elements in the structure;

locating the starting element at a starting position in the rendering space; and for each of a set of other elements in the structure, mapping the element's position in the negatively curved space to a position in the rendering space; the set of other elements including at least a parent and a child of the starting element; each element in the set of other elements being reachable from the starting element by a path that leads only through elements in the set; each element's path including a preceding element that immediately precedes the element in the path;

in mapping the position of each element in the set of other elements, the processor using the element's position relative to the preceding element in the negatively curved space and the position of the preceding element in the rendering space to obtain the element's position in the rendering space.

* * * * *